United States Patent
Seo

(10) Patent No.: US 7,120,098 B2
(45) Date of Patent: Oct. 10, 2006

(54) APPARATUS AND METHOD FOR CONTROLLING OPTICAL RECORDING POWER IN AN OPTICAL DRIVE

(75) Inventor: Jin-gyo Seo, Gyeonggi-do (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 0 days.

(21) Appl. No.: 11/178,295

(22) Filed: Jul. 12, 2005

(65) Prior Publication Data
US 2005/0243669 A1 Nov. 3, 2005

Related U.S. Application Data

(63) Continuation of application No. 10/369,649, filed on Feb. 21, 2003, now Pat. No. 6,934,235.

(30) Foreign Application Priority Data
Feb. 22, 2002 (KR) ................. 2002-9487

(51) Int. Cl.
*G11B 5/09* (2006.01)
*G11B 7/00* (2006.01)

(52) U.S. Cl. .............. 369/47.5; 369/47.53; 369/59.1; 369/47.36

(58) Field of Classification Search ............ None
See application file for complete search history.

(56) References Cited
U.S. PATENT DOCUMENTS

| | | | |
|---|---|---|---|
| 5,446,716 A | 8/1995 | Eastman et al. | |
| 5,625,615 A | 4/1997 | Dente et al. | |
| 6,704,269 B1 | 3/2004 | Ogawa | |

FOREIGN PATENT DOCUMENTS

| | | |
|---|---|---|
| CN | 1320909 | 11/2001 |
| EP | 1 058 246 | 12/2000 |
| JP | 1-194134 | 8/1989 |
| JP | 7-225948 | 8/1995 |
| JP | 8-124163 | 5/1996 |
| JP | 9-171632 | 6/1997 |
| JP | 10-64065 | 3/1998 |

(Continued)

OTHER PUBLICATIONS

Japanese Office Action issued with respect to Japanese Office Action No. 2003-006385 (Issue Date: Oct. 28, 2005).

(Continued)

*Primary Examiner*—Muhammad Edun
(74) *Attorney, Agent, or Firm*—Staas & Halsey LLP

(57) ABSTRACT

An optical recording power controlling apparatus and method, in which the determination conditions for received Non Return to Zero Inverted (NRZI) data and the varying range of the optical recording power level are set depending on the multiple-speed of recording and the type of an optical medium, and the varying range of the optical recording power level is controlled so that optical recording power provided to a light emitting device is optimal for the multiple-speed of recording and the type of an optical medium. In the optical recording power controlling apparatus, a system control unit sets the discrimination conditions of received data to be recorded and the varying range of the optical recording power level, depending on the multiple-speed of recording and the type of an optical medium. An optical recording power generator varies the level of optical recording power to be provided to the light emitting device according to the range of the optical recording power level and the result of the discrimination of the received data made under the discrimination conditions.

11 Claims, 5 Drawing Sheets

FOREIGN PATENT DOCUMENTS

| | | |
|---|---|---|
| JP | 11-86291 | 3/1999 |
| JP | 2000-11382 | 1/2000 |
| JP | 2000-30255 | 1/2000 |
| JP | 2000-187842 | 7/2000 |
| JP | 2000-222733 | 8/2000 |
| JP | 2000-260024 | 9/2000 |
| JP | 2000-285464 | 10/2000 |
| JP | 2000-348349 | 12/2000 |
| JP | 2001-209958 | 8/2001 |
| JP | 2001-229538 | 8/2001 |
| JP | 2001-229561 | 8/2001 |
| JP | 2001-344751 | 12/2001 |
| JP | 2001-351249 | 12/2001 |
| JP | 2002-25068 | 1/2002 |
| JP | 2002-42337 | 2/2002 |
| JP | 2002-74669 | 3/2002 |
| JP | 2002-100043 | 4/2002 |
| JP | 2000-90554 | 6/2002 |
| JP | 2003-123255 | 4/2003 |
| JP | 2003-187445 | 7/2003 |
| KR | 2001-92670 | 10/2001 |
| WO | 01/08143 | 2/2001 |

OTHER PUBLICATIONS

Office Action dated Nov. 5, 2004 issued by the Chinese Patent Office in corresponding Chinese Patent Application No. 02159830.4.

APPARATUS AND METHOD FOR CONTROLLING OPTICAL RECORDING POWER IN AN OPTICAL DRIVE

CROSS-REFERENCE TO RELATED APPLICATION

This application is a continuation of application Ser. No. 10/369,649 filed Feb. 21, 2003, which is now U.S. Pat. No. 6,934,235.

This application claims the benefit of Korean Patent Application No. 2002-9487, filed on Feb. 22, 2002, in the Korean Intellectual Property Office, the disclosure of which is incorporated herein by reference.

BACKGROUND OF THE INVENTION

1. Field of the Invention

The present invention relates to an apparatus and method for controlling recording power in an optical drive, and more particularly, to an apparatus and method for controlling the optical recording power of a light emitting device so that the level of light output from the light emitting device is optimal for the type and recording multiple-speed (or referred to as multiple-speed) of optical media.

2. Description of the Related Art

Current optical media are roughly classified into optical media for compact disks (CDs) and optical media for digital versatile discs (DVDs). CD read (CD-R) and CD read/write (CD-RW) optical drives are widely used as optical drives for CDs. DVD-RW, DVD-R, DVD+RW and DVD-RAM optical drives are currently on the market as optical drives for DVDs. However, since optical media have different recording properties, they also have different shapes of recording pulses from one another.

For example, the recording pulse of a DVD-RAM or CD-RW can be defined as an on-start multi-pulse type since a multi-pulse train starts from a high state within a channel clock. In contrast, recording pulses of DVD+RW and DVD-R can be defined as an off-start multi-pulse type since a multi-pulse train starts from a low state within a channel clock. The recording pulse of a CD-R can be defined as a non-multi-pulse type since it is similar to a non-return to zero inverted (hereinafter referred to as NRZI) data without using multiple pulses.

Conventional methods have been developed to control the optical recording power of a laser diode (LD) for use as a light emitting device to generate a variety of shapes of recording pulses from a single optical drive. In the conventional optical recording power controlling apparatus and method, the optical recording power of a LD is controlled by considering the relationship between the size of a recording mark of received NRZI data and that of either of the spaces before and behind the recording mark. The optical recording power of the LD is also controlled by increasing or decreasing the optical output level reflected by an optical medium and detected by a photodiode used as a light receiving device to an optimal optical output level.

However, in the conventional optical recording power controlling apparatus and method, determining the optimal optical output level is limited to consideration of the relationship between the size of a recording mark of received NRZI data and that of either of the spaces before and behind the recording mark. The varying range of a recording power level is also limited as only the peak power level of a recording pulse varying in units of recording marks.

Thus, the conventional recording power controlling apparatus and method has a limit in adaptively controlling the optical recording power of an LD in order to meet the specifications of different types of optical media, including the recording multiple-speeds of optical media.

SUMMARY OF THE INVENTION

To solve the above and/or other problems, it is an aspect of the present invention to provide an apparatus and method controlling the level of the optical recording power of a light emitting device in an optical drive so that the light emitting device outputs an optimal level of optical power depending on the type of an optical medium and a recording multiple-speed.

Another aspect of the present invention is to provide an apparatus and method of controlling the level of optical recording power by setting the determination condition for received Non Return to Zero Inverted (NRZI) data and the varying range of an optical recording power level depending on the type of an optical medium and a recording multiple speed. Accordingly, the level of the optical recording power of a light emitting device is maintained at an optimal level for the multiple-speed and the type of optical medium.

Still another aspect of the present invention is to provide an apparatus and method optimally controlling the level of the optical recording power of a light emitting device, by adaptively selecting and operating a matrix-type optical recording power generator variably generating suitable optical recording power levels according to the multiple speed and the type of optical medium.

The above and/or other aspects of the present invention are achieved by an apparatus controlling the optical recording power of a light emitting device in an optical drive, the apparatus including a system control unit and an optical recording power generator. The system control unit sets the discrimination conditions of received data type to be recorded and the varying range of the optical recording power level, according to the optical medium type and the recording multiple speed. The optical recording power generator varies the level of the optical recording power of the light emitting device according to the varying range of the optical recording power level and the result of the discrimination of the received data made under the discrimination conditions and generates the varied optical recording power level.

The above and/or other aspects of the present invention are also achieved by an apparatus controlling the optical recording power of a light emitting device emitting light corresponding to a recording pulse to an optical medium in an optical drive, the apparatus including a system control unit, a data discrimination unit, and an optical recording power generator. The system control unit sets the discrimination conditions of received data to be recorded and the varying range of the optical recording power level, according to the type of the optical medium and a recording multiple-speed. The data discrimination unit discriminates the received data using the discrimination conditions set in the system control unit. The optical recording power generator adaptively varies the level of the optical recording power of the light emitting device according to the result of the discrimination by the data discrimination unit and the varying range of the optical recording power level set by the system control unit.

The optical recording power generator may vary the level of the optical recording power applied to the light emitting device in such a way that individual levels into which the optical recording power level is divided are varied.

When the received data is Non Return to Zero Inverted (NRZI) data, the NRZI data is discriminated based on a recording mark and a space, and the levels are a plurality of levels corresponding to sections into the recording mark is divided along the temporal axis.

Depending on the type of optical medium and the recording multiple-speed, the system control unit determines one out of a first discrimination condition analyzing the size of a recording mark, a second discrimination condition analyzing the size of a space, a third discrimination condition analyzing the size of a current recording mark and the size of the space behind the recording mark, and a fourth discrimination condition analyzing the size of the recording mark and the size of the space before the recording mark.

The system control unit may provide varying ranges of power, including a first adaptive varying level type varying a peak optical recording power level, a second adaptive varying level type varying all of the optical recording power levels, a third adaptive varying level type varying an overwrite or erase optical recording power level, a fourth adaptive varying level type varying a cooling optical recording power level, a fifth adaptive varying level type varying a bottom optical recording power level, a sixth adaptive varying level type varying the peak optical recording power level in a recording mark and the erase optical recording power level in a space area, and a seventh adaptive varying level type independently varying all of the optical recording power levels divided according to the operational characteristics of the light emitting device with respect to the received data.

The optical recording power generator may constitute functional blocks varying the level of the optical recording power, using a plurality of matrix types based on the size of a recording mark and the size of a space. The system control unit may set up usable matrix types depending on the type of optical medium and the recording multiple-speed.

The optical recording power generator may include first through fourth tables, first through fifth selectors, and a storage unit. The first table has a plurality of levels for the peak optical recording power level. The second table has a plurality of levels for the erase or first bias optical recording power level. The third table has a plurality of levels for the cooling or second bias optical recording power level, The fourth table has a plurality of levels for the bottom or third bias optical recording power level. The first selector selects a level from the levels stored in the first table, based on the range and the result of the discrimination of the received data. The second selector selects a level from the levels stored in the second table, based on the range and the result of the discrimination of the received data. The third selector selects a level from the levels stored in the third table, based on the range and the result of the discrimination of the received data. The fourth selector selects a level from the levels stored in the fourth table, based on the range and the result of the discrimination of the received data. The storage unit individually stores the optical recording power levels selected by the first through fourth selectors. The fifth selector selects necessary levels from the optical recording power levels stored in the storage unit, based on the shape of the received data and the type of a recording waveform provided to the light emitting device, the recording waveform type being determined depending on the recording multiple-speed and the type of optical medium.

The above and/or other aspects of the present invention are achieved by an apparatus controlling the optical recording power of a light emitting device emitting light corresponding to a recording pulse to an optical medium in an optical drive. The apparatus includes a system control unit, a data discrimination unit, an adder, a recording waveform control unit, and an optical recording power generator. The system control unit sets the discrimination conditions of received NRZI data and the varying range of the optical recording power level, based on the type of optical medium and the recording multiple-speed. The data discrimination unit discriminates the received NRZI data under the discrimination conditions set by the system control unit, and outputs an optimal optical recording power level based on the result of the discrimination. The adder increases or decreases light reflected by the optical medium or received directly from the light emitting device, based on the optimal optical recording power level. The recording waveform control unit controls the form of a recording waveform to be applied to the light emitting device, depending on the result of the discrimination by the data discrimination unit, the multiple-speed of recording, and the type of optical medium. The optical recording power generator updates a plurality of levels for the optical recording power level depending on the output of the adder, selects a level from the plurality of levels, which are updated depending on the varying range of the optical recording power level set by the system control unit and the result of the discrimination made by the data discrimination unit under the discrimination conditions, selects necessary optical recording power levels from the levels selected under the control of the waveform recording control unit, and provides the selected necessary optical recording power levels to the light emitting device.

The above and/or other aspects of the present invention are achieved by a method of controlling the optical recording power of a light emitting device in an optical drive. In this method, the discrimination conditions of received recording data and the varying range of optical recording power levels are set depending on a recording multiple-speed and the type of optical medium, when an adaptive optical recording power level control mode is set. An optical recording power level is produced by varying the level of optical recording power to be applied to the light emitting device according to the range of the optical recording power level and the result of the discrimination of the received data made based on the discrimination conditions.

The optical recording power level may be produced by adaptively varying levels into which the optical recording power level is divided.

The above and/or other aspects of the present invention are achieved by a method of controlling the optical recording power of a light emitting device emitting light corresponding to a recording pulse to an optical medium in an optical drive. In the method, the discrimination conditions of received data to be recorded and the varying range of the optical recording power level are set depending on a recording multiple-speed and the type of an optical medium, when an adaptive optical recording power level control mode is set. The received data is discriminated under the discrimination conditions to detect an optimal optical recording power level. The power of light reflected by the optical medium is adjusted based on the optimal optical recording power level. The optical recording power level is divided into a plurality of levels which are updated on the basis of the adjusted light power. A level is selected depending on the varying range of the optical recording power level and the result of the discrimination of the received data made under the discrimination conditions. Necessary levels are selected from the optical recording power levels, depending on the type of a recording waveform, the result of the discrimination of the received data, and the type of an optical medium. The selected optical recording power levels are provided for driving the light emitting device.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the present invention will become more readily appreciated from the following description of embodiments, taken in conjunction with the accompanying drawings in which.

DETAILED DESCRIPTION OF THE PREFERRED EMBODIMENTS

Figure 1:
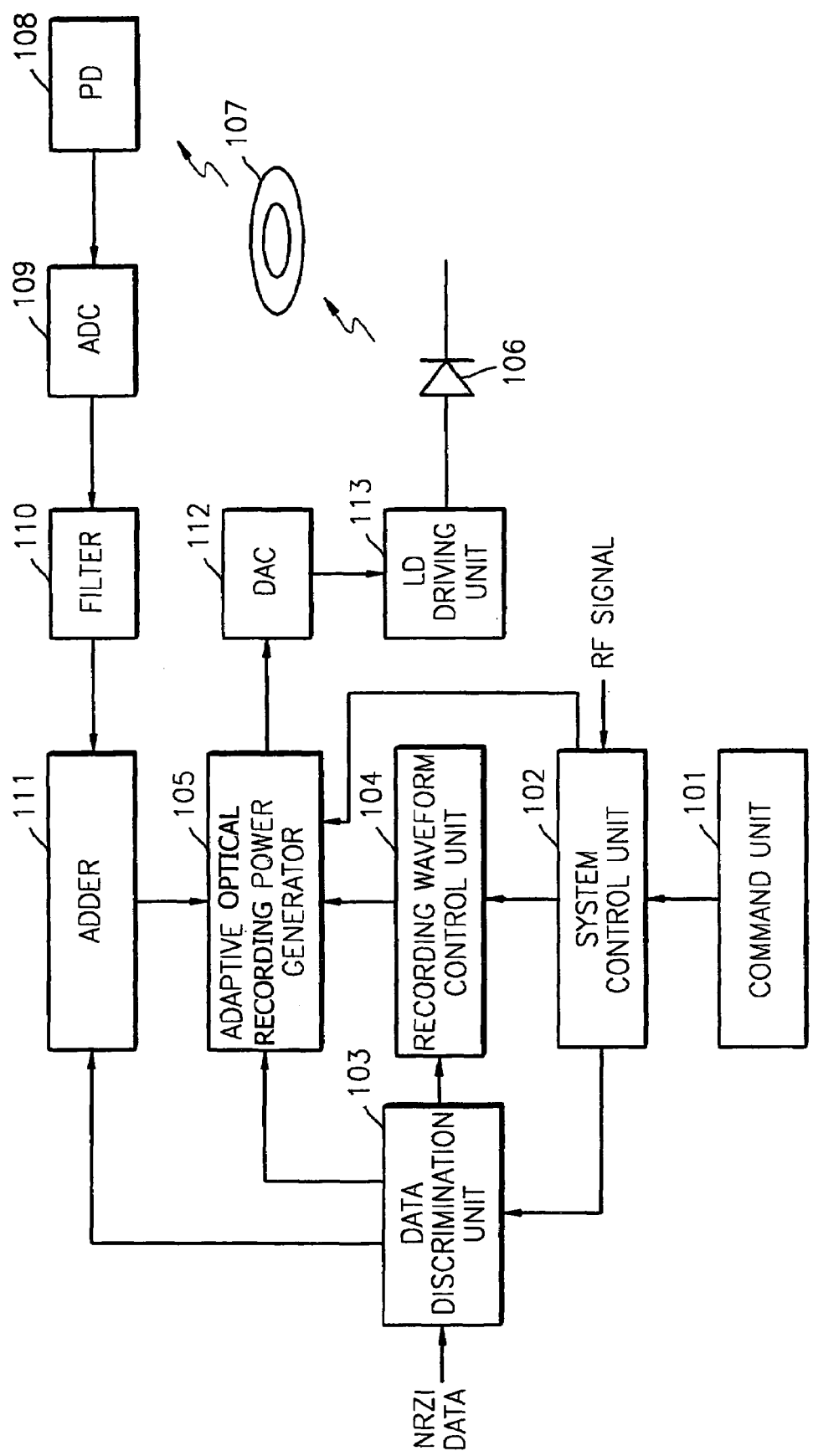
FIG. 1 is a block diagram explaining the function of an optical drive having an optical recording power controlling apparatus according to an embodiment of the present invention.

Embodiments of the present invention are described below, examples of which are illustrated in the accompanying drawings, wherein like reference numerals refer to the like elements throughout.

Referring to FIG. 1, an optical drive having an optical recording power controlling apparatus according to an embodiment of the present invention utilizes a disc 107 and includes a command unit 101, a system control unit 102, a data discrimination unit 103, a recording waveform control unit 104, an adaptive optical recording power generator 105, a laser diode (LD) 106, a photodiode (PD) 108, an analog-to-digital converter (ADC) 109, a filter 110, an adder 111, a digital-to-analog converter (DAC) 112, and an LD driving unit 113. The LD 106 is a light emitting device, the disc 107 is an optical medium, and the PD 108 is a light receiving device.

The command unit 101 sends a command from a user to the system control unit 102. Through the command unit 101, the user can input information regarding the multiple-speed of the optical drive and set values for the type of optical medium inserted into the optical drive. The set values may be, for example, power levels, and values associated with the pulse types of a recording waveform or values stored in tables described below.

The system control unit 102 analyzes the type of disc 107 using an RF signal reproduced from the disc 107, and determines the discrimination condition for the data discrimination unit 103 and the varying range of an optical recording power level for the adaptive optical recording power generator 105 on the basis of the information on the type of the disc 107 and the multiple-speed information received via the command unit 101. The multiple-speed information also may be obtained by other methods, including an existing well-known method.

The discrimination condition is used to analyze received Non Return to Zero Inverted (NRZI) data. The discrimination conditions may be set as shown in Table 1.

TABLE 1

| Discrimination condition | | Content |
|---|---|---|
| First discrimination condition | Only current mark | Only the size of a current mark is used as the discrimination condition |
| Second discrimination condition | Only current space | Only the size of a current space is used as the discrimination condition |
| Third discrimination condition | Current mark & rear space | The size of a current mark and that of the space behind the current mark are used as the discrimination condition |
| Fourth discrimination condition | Current mark & front space | The size of a current mark and that of the space before the current mark are used as the discrimination condition |

Figure 2:
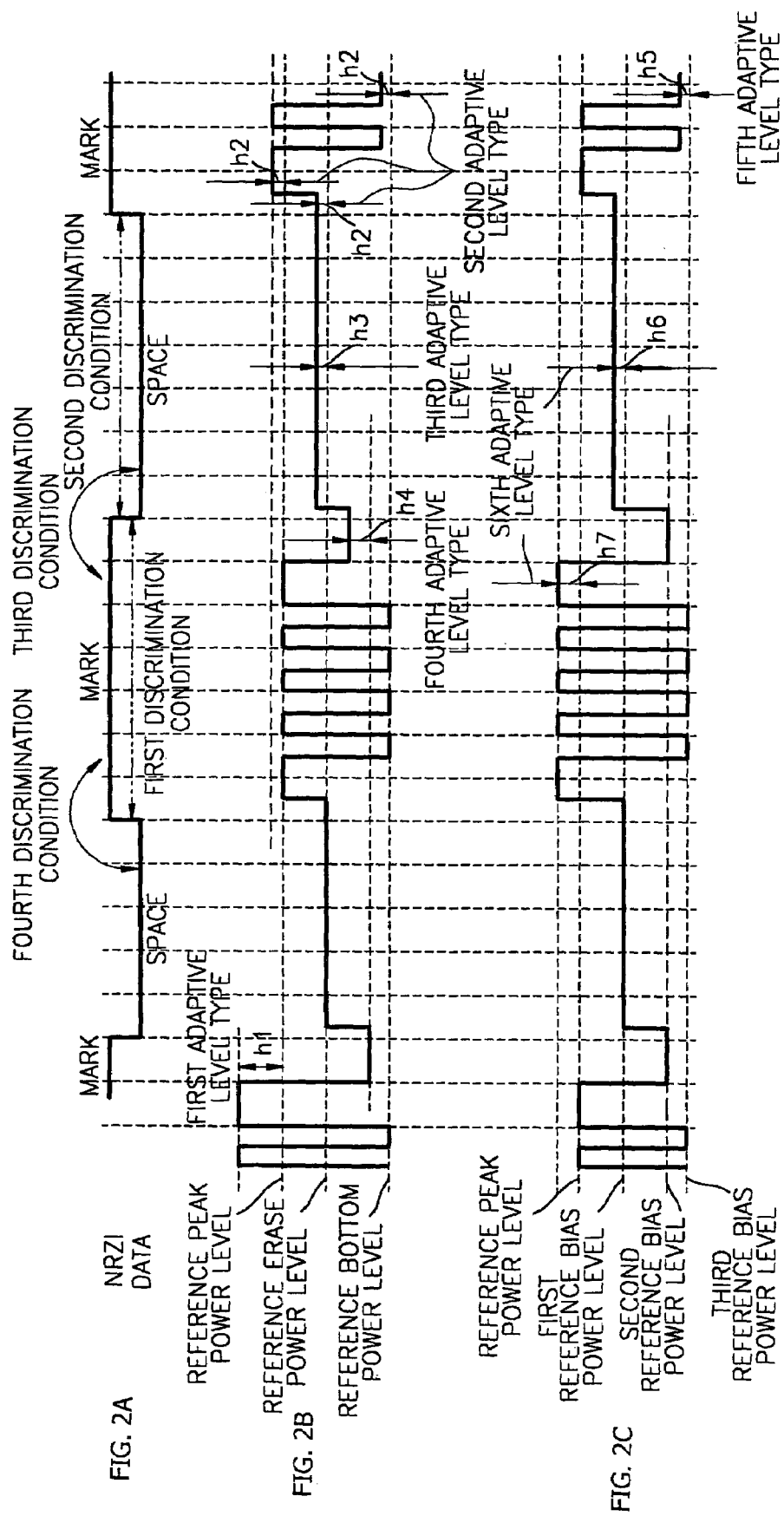
FIGS. 2A–2C are timing diagrams showing determination conditions according to the present invention and adaptive level types for optical recording power according to an embodiment of the present invention.

The first through fourth discrimination conditions are shown in FIG. 2A. The system control unit 102 determines a discrimination condition corresponding to the type of disc 107 and a recording multiple-speed (hereinafter, referred to as a multiple speed), from the first through fourth discrimination conditions of Table 1, and controls the data discrimination unit 103 to discriminate the received NRZI data according to the determined discrimination condition.

The varying range of optical recording power levels include an optical power level to vary among optical recording power levels applied to the LD 106 and the variation of the range of the optical power level. Varying ranges to be determined by the system control unit 102 are defined as in Table 2. The system control unit 102 can determine an adaptive varying level type corresponding to the type of the disc 107 and a multiple speed, from adaptive varying level types as shown in Table 2.

TABLE 2

| | Varying range | Content |
|---|---|---|
| First adaptive variable level type | Only peak level | Vary only a peak optical recording power level |
| Second adaptive variable level type | Entire power level | Vary the entire optical recording power level including the peak level and first, second and third bias levels |
| Third adaptive variable level type | Only erase level of space | Vary only the erase optical recording power level in a space area for overwriting or erasing |
| Fourth adaptive variable level type | Only cooling level | Vary only the cooling optical recording power level |
| Fifth adaptive variable level type | Only bottom level | Vary only the bottom optical recording power level |
| Sixth adaptive variable level type | Only peak and erase levels | Vary only the peak optical recording power level in a mark area and the erase optical recording power level in a space area |
| Seventh adaptive variable level type | Each power level | Independently vary the peak optical recording level and first, second, and third bias optical recording levels according to discrimination condition |
| Eighth adaptive | The others | Vary the optical recording |

TABLE 2-continued

| Varying range | Content |
| --- | --- |
| variable level type | level by combining or repeating the first through seventh adaptive variable level types according to the discrimination condition |

The first through sixth adaptive variable level types are shown in FIGS. 2B and 2C. In the first adaptive level type shown in FIG. 2B, the peak power level is varied by h1. In the second adaptive level type shown in FIG. 2B, the peak power level, the erase power level and the bottom power level are varied by h2. In the third adaptive level type shown in FIG. 2B, the erase power level is varied by h3. In the fourth adaptive level type shown in FIG. 2B, the cooling power level is varied by h4. In the fifth adaptive level type shown in FIG. 2C, the bottom power level (or third bias power level) is varied by h5. In the sixth adaptive level type shown in FIG. 2C, the peak power level is varied by h7 and the erase power level (or first bias power level) is varied by h6. Here, the widths of h7 and h6 are different from each other.

Accordingly, if the system control unit 102 decides the third adaptive variable level type according to the type of disc 107 and the multiple speed, the adaptive optical recording power generator 105 produces an optical recording power level in which only the erase power level in a space area for overwriting or erasing has been varied according to the result of the discrimination by the data discrimination unit 103.

The system control unit 102 provides information about the type of disc 107 and the multiple-speed to the recording waveform control unit 104.

The data discrimination unit 103 discriminates received NRZI data according to the discrimination condition determined by the system control unit 102. The received NRZI data is recorded on the disc 107. If the system control unit 102 selects the first discrimination condition, the data discrimination unit 103 discriminates the received NRZI data in consideration of only the size of a mark. The data discrimination unit 103 also detects an optimal optical recording power level from levels that are pre-set according to discrimination conditions and provides the detected optimal optical recording power level to the adder 111.

In order to provide an optimal optical recording power level, the data discrimination unit 103 includes a table (not shown) in which the information on optimal optical recording power levels corresponding to the first discrimination condition is stored, a table (not shown) in which information on optimal optical recording power levels corresponding to the second discrimination condition is stored, a table (not shown) in which information on optimal optical recording power levels corresponding to the third discrimination condition is stored, and a table (not shown) in which information on optimal optical recording power levels corresponding to the fourth discrimination condition is stored. If the system control unit 102 selects the first discrimination condition, the data discrimination unit 103 analyzes the size of a recording mark in the received NRZI data, detects the optimal optical recording power level information in the table corresponding to the result of the analysis, and provides the detected information to the adder 111. For example, If the mark size of the analysed NRZI data is 3T, the data discrimination unit 103 detects the optimal optical recording power level information corresponding to 3T stored in the table corresponding to the first discrimination condition and provides the detected information to the adder 111.

The data discrimination unit 103 provides the result of the discrimination of the received NRZI data according to the determined discrimination condition to the recording waveform control unit 104 and the adaptive recording optical power generator 105.

The recording waveform control unit 104 determines the optimal shape for a recording waveform generated by the LD 106, based on the information about the type of the disc 107 and the multiple-speed provided from the system control unit 102 and the result of the discrimination by the data discrimination unit 103. Then, the recording waveform control unit 104 uses the selected optimal recording waveform to determine whether the adaptive optical recording power generator 105 produces an optical recording power level. If the optimal recording waveform includes peak power, erase power and bottom power, the recording waveform control unit 104 controls the optical recording power generator 105 so that the levels of the peak power, erase power and bottom power are selected from the power levels for sections and output at their respective times.

The adaptive recording optical power generator 105 may constitute a matrix based on the sizes of a recording mark and a space. Possible matrix types are shown in Table 3.

TABLE 3

| | Used matrix range | Content |
| --- | --- | --- |
| First matrix type | 10 × 1 | Spaces of 10 different sizes or 10 marks of 3T through 11T and 14T are provided |
| Second matrix type | 10 × 10 | Spaces of 10 different sizes and 10 marks of 3T through 11T and 14T are provided, and the 10 spaces are combined with the 10 marks |
| Third matrix type | 4 × 1 | The sizes of marks or spaces are divided into 4 groups |
| Fourth matrix type | 4 × 4 | The sizes of marks and spaces are divided into 4 groups, and the four mark groups are combined with the four space groups |
| Fifth matrix type | 3 × 1 | The sizes of marks or spaces are divided into 3 groups |
| Sixth matrix type | 3 × 3 | The sizes of marks and spaces are divided into 3 groups, and the three mark groups are combined with the three space groups |

The adaptive optical recording power generator 105 can be constructed in any of the matrix types of Table 3. Alternatively, the adaptive optical recording power generator 105 can be constructed to include all of the matrix types of Table 1 and operate in a matrix configuration selected by the system control unit 102 depending on the type of the disc 107 and the multiple speed.

Figure 3:
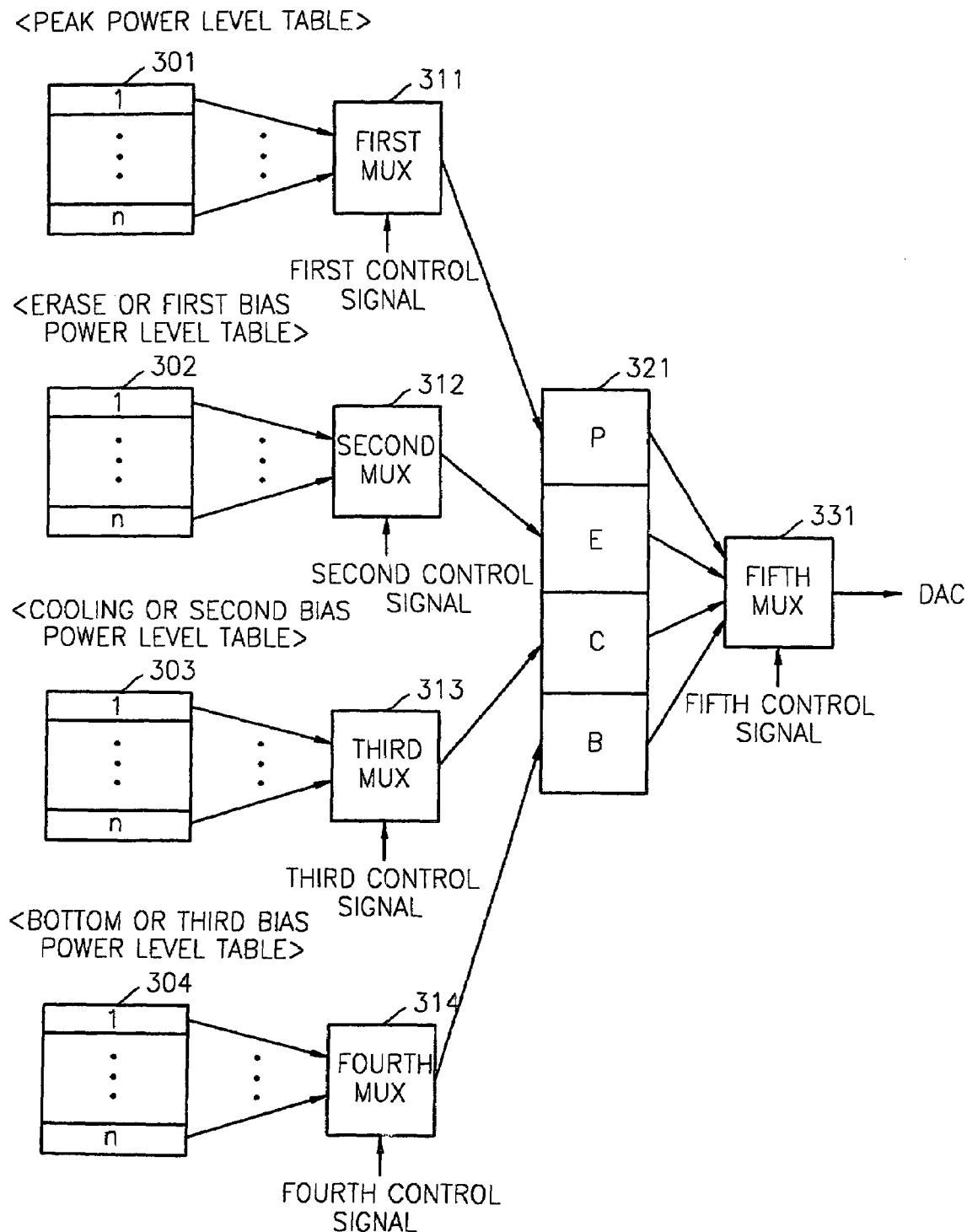
FIG. 3 shows an embodiment of the adaptive recording optical power generator shown in FIG. 1.

FIG. 3 shows an embodiment of the adaptive optical recording power generator 105, the embodiment adopting the third matrix type of Table 3. Referring to FIG. 3, the adaptive optical recording power generator 105 includes a peak power level table 301, an erase or first bias power level table 302, a cooling or second bias power level table 303, a bottom or third bias power level table 304, first through fifth multiplexers 311, 312, 313, 314 and 331, and a storage unit 321.

The peak power level table 301 stores a choice of n peak power levels. In the example of FIG. 3, n is 4. Each of the erase or first bias power level table 302, the cooling or second bias power level table 303, and the bottom/third bias power level table 304 stores a choice of n power levels. The power levels stored in the tables 301 through 304 can be updated depending on the data provided from the adder 111. That is, the power levels can be updated to increase or decrease by the difference provided from the adder 111.

The first multiplexer 311 selects one from n peak power levels stored in the peak power level table 301, according to a first control signal produced as a result of the discrimination of received NRZI data by the data discrimination unit 103 and the varying range of the optical recording power level, which is determined by the system control unit 102.

That is, even if the peak power level is not varied, the first multiplexer 311 selects a peak power level corresponding to the optical recording power obtained by the adder 111 from the peak power levels stored in the peak power level table 301, based on the optimal optical recording power level provided from the data discrimination unit 103 regardless of the result of the NRZI data discrimination.

On the other hand, if the peak power level is varied, the first multiplexer 311 selects an appropriate peak power level from the peak power levels stored in the table 301, according to the result of the NRZI data determination. Such selection by the first MUX 311 is achieved according to the first control signal, which the adaptive recording optical power generator 105 generates by combining the result of the NRZI data discrimination with the varying range. However, the first control signal may be produced by the system control unit 102.

Similar to the first multiplexer 311, the second multiplexer 312 selects one of the n erase or first bias power levels stored in the table 302, according to a second control signal, which is produced as a result of the NRZI data discrimination and the varying range.

Like the first multiplexer 311, the third multiplexer 313 selects one of the n cooling or second bias power levels stored in the table 303, according to a third control signal produced in as a result of the NRZI data discrimination and the varying range.

Like the first multiplexer 311, the fourth multiplexer 314 selects one of the n bottom or third bias power levels stored in the table 304, according to a fourth control signal produced as a result of the NRZI data discrimination and the varying range. The power levels selected by the multiplexers 311, 312, 313 and 314 are stored in the storage unit 321.

The storage unit 321 stores the power levels separately. That is, the storage unit 321 stores the peak power level, the erase power level, the cooling power level, and the bottom power level in storage regions P, E, C and B, respectively. However, if the optical recording power level is divided into M levels and M tables exist accordingly, the storage unit 321 has M regions for separately storing M optical power levels.

The fifth multiplexer 331 selects only necessary recording power levels from the recording power levels stored in the storage unit 321, on the basis of the temporal axis and according to a fifth control signal provided from the recording waveform control unit 104. If the recording waveform determined by the recording waveform control unit 104 includes a peak power level, an erase power level, and a bottom power level as mentioned above upon the description of the recording waveform control unit 104, the fifth multiplexer 331 selects the peak power level stored in the P region, the erase power level stored in the E region, and the bottom power level stored in the B region, on the basis of the temporal axis. Such a selection by the fifth multiplexer 331 is performed according to the fifth control signal. The optical recording power levels output from the fifth multiplexer 331 are transferred to the DAC 112. Here, the first through fifth multiplexers 311, 312, 313, 314 and 331 operate as selectors.

Figure 4:
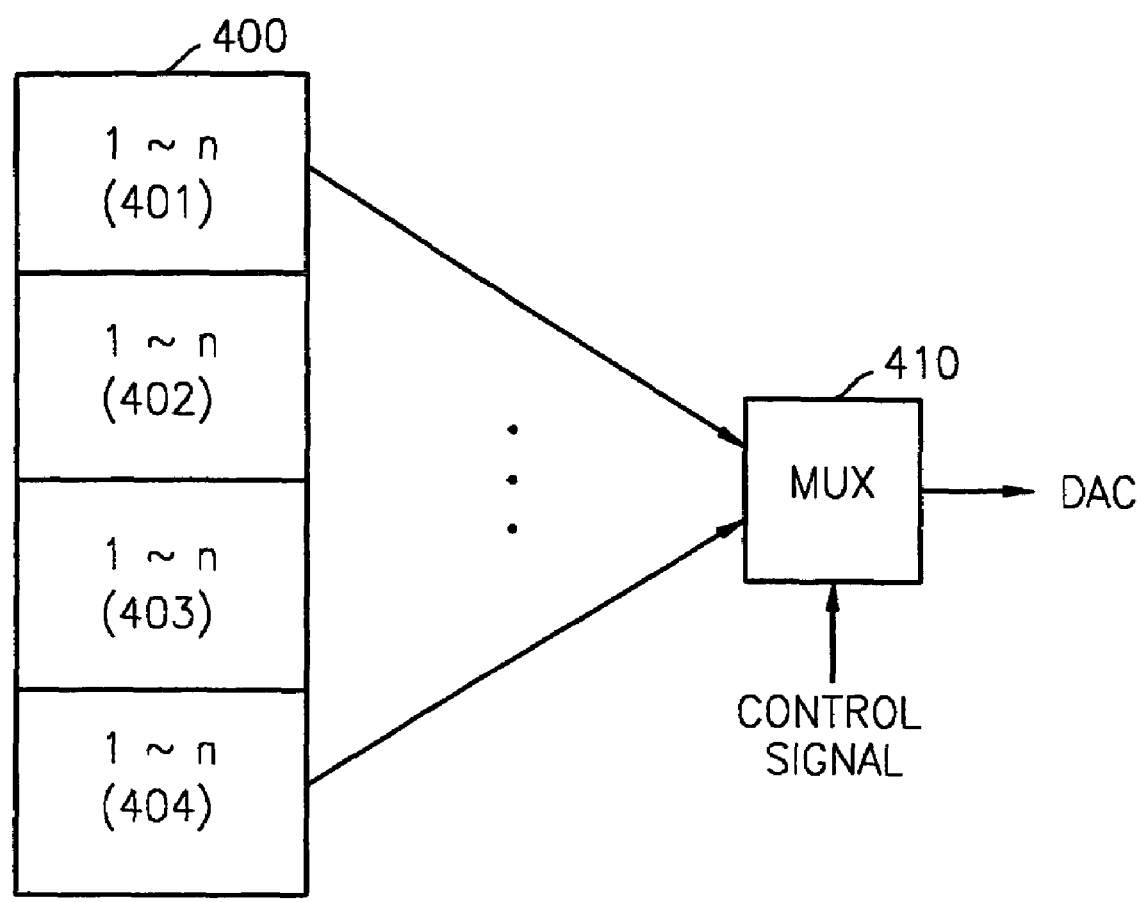
FIG. 4 shows another embodiment of the adaptive optical recording power generator shown in FIG. 1.

The adaptive optical recording power generator 105 can be constructed as shown in FIG. 4. FIG. 4 shows another embodiment of the adaptive optical recording power generator 105, in which the tables 301 through 304 shown in FIG. 3 constitute an array or memory 400, and a multiplexer 410 selects an appropriate power level from the levels stored in the array or memory 400 and transfers it to the DAC 112.

The array or memory 400 includes four regions 401, 402, 403, and 404. The region 401 stores n peak power levels, as the peak power level table 301 shown in FIG. 3. The region 402 stores n erase or first bias power levels, as the erase or first bias power level table 302 shown in FIG. 3. The region 403 stores n cooling or second bias power levels, as the cooling or second bias power level table 303 shown in FIG. 3. The region 404 stores n bottom or third bias power levels, as the bottom or third bias power level table 304 shown in FIG. 3.

The multiplexer 410 sequentially selects a power level from the power levels stored in the regions 401 through 404 of the array or memory 400 according to a control signal, and transfers it to the DAC 112. The control signal functions as an address for reading a power level from the array or memory 400. The control signal can be produced by the combination of the NRZI data discrimination by the data discrimination unit 103, the varying range determined by the system control unit 102, and recording waveform control signals provided by the recording waveform control unit 104.

Referring back to FIG. 1, the LD 106 emits light corresponding to a recording pulse to the disc 107. The disc 107 stores data discriminating the type of disc in its lead-in region. The PD 108 can be a monitor-PD or front-PD receiving light reflected by the disc 107 or emitted from the LD 106. The received light is amplified and then transmitted to the ADC 109.

The ADC 109 converts the light output from the PD 108 into digital data. The filter 110 filters out noise from the digital data received from the ADC 109. Data output from the filter 110 is transferred to the adder 111. The adder 111 increases or decreases the optical output value received from the filter 110, based on the optimal recording power level transferred from the data discrimination unit 103. The increase or decrease is performed to maintain the light output from the LD 106 constant regardless of a change in temperature. The result of the increase or decrease by the adder 111 is transmitted to the adaptive optical recording power generator 105. Depending on the output of the adder 111, the adaptive optical recording power generator 105 updates the power levels stored in the tables 301 through 304.

The DAC 112 converts an optical recording power level produced by the adaptive optical recording power generator 105 into an analog signal and transfers the analog signal to the LD driving unit 113. The LD driving unit 113 drives the LD 106 according to the received analog signal. Alternatively, the LD 106 can be driven according to the analog signal from the DAC 112 in the absence of the LD driving unit 113.

Figure 5:
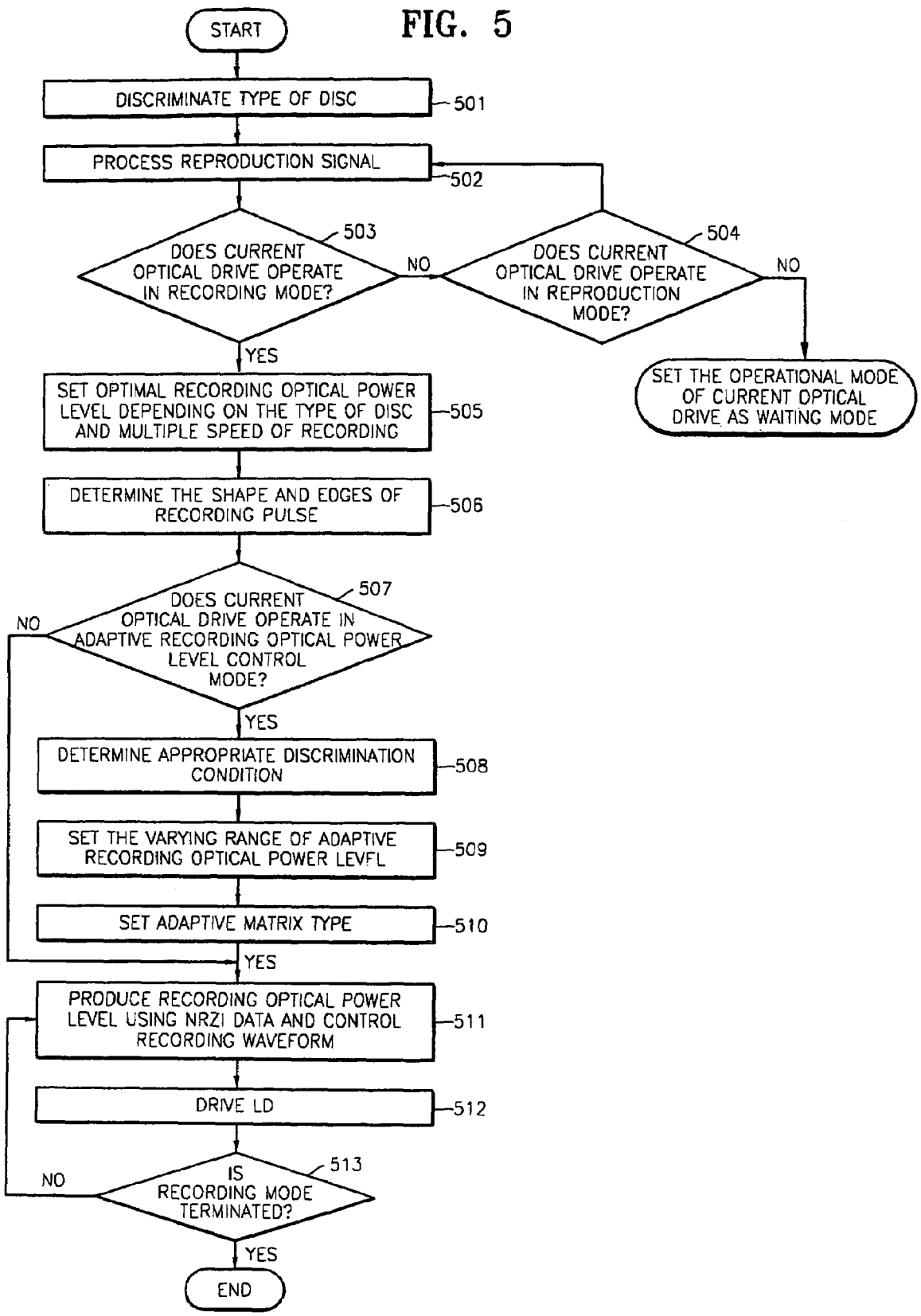
FIG. 5 is a flowchart illustrating an optical recording power controlling method according to the present invention.

FIG. 5 is a flowchart illustrating an optical recording power controlling method according to the present invention. In operation 501, the system control unit 102 discriminates the type of disc 107 by analyzing an RF signal reproduced from the disc 107.

In operation 502, the system control unit 102 initializes a gain or offset that is appropriate for the recognized disc type, and performs reproduction signal processing in order to ascertain if the disc type recognized in operation 501 is right, by reading the lead-in region of the disc 107 inserted in the optical drive shown in FIG. 3. In operation 502, the system control unit 102 also performs reproduction signal processing in order to establish all the conditions for driving the optical drive by reading data corresponding to parameters necessary for driving the optical drive from the lead-in region of the disc 107.

In operation 503, the system control unit 102 determines whether the operational mode of the current optical drive is not a recording mode. If the operating mode of the current optical drive is set as a recording mode, the system control unit 102 determines whether the operating mode of the current optical drive is a reproduction mode, in operation 504. If operation 504 determines that the operational mode of the current optical drive is a reproduction mode, the system control unit 102 performs the operation 502 to perform a normal reproduction mode. On the other hand, if the operational mode of the current optical drive is not a reproduction mode, the system control unit 102 sets the operational mode of the current optical drive as a waiting mode.

If the operational mode of the current optical drive is a recording mode, the system control unit 102 sets an optimal optical recording power level corresponding to the recognized multiple-speed and the type of disc 107, in operation 505. That is, the system control unit 102 sets an optimal read power level, an optimal peak power level, an optimal erase power level, an optimal cooling power level, and an optimal bottom power level. These power levels are optimal automatic power control (APC) power levels. Accordingly, the set optimal optical recording power level serves as the reference value of the optical recording power levels stored in the tables of the data discrimination unit 103 and in the tables of the adaptive optical recording power generator 105. That is, the optical recording power level values stored in the tables of the data discrimination unit 103 and those of the adaptive optical recording power generator 105 are updated by the system control unit 102 on the basis of the optimal optical recording power level set in operation 505.

In operation 506, the current optical drive determines the shape and edges of a recording pulse to be generated by the LD 106, depending on the type of disc 107 and the recording multiple-speed of an optical drive. The edges are the rising and falling edges of the first or last pulse.

In operation 507, the system control unit 102 determines whether the current optical drive operates in an adaptive optical recording power level control mode. If the current optical drive operates in an adaptive optical recording power level control mode, the system control unit 102 selects a discrimination condition appropriate for the type of disc 107 and the multiple-speed from the discrimination conditions shown in Table 1, in operation 508.

In operation 509, the system control unit 102 sets the varying range of an adaptive optical recording power level depending on the type of disc 107 and the multiple speed. That is, the system control unit 102 sets the varying range of the adaptive optical recording power level by determining an optimal adaptive level type corresponding to the type of the current optical medium and the multiple speed from the adaptive level types as shown in Table 2.

In operation 510, the system control unit 102 sets an adaptive matrix type appropriate for the type of disc 107 and the multiple-speed. That is, the system control unit 102 determines a matrix type corresponding to the type of the current optical medium and the multiple speed from a choice of matrix types as shown in Table 3. If the hardware of an optical drive is not constructed to variably set a matrix type, the system control unit 102 can set the operation conditions for changeable parts of the matrix type set in operation 510. In other words, the hardware of an optical drive may be constructed to support a single matrix type among the matrix types defined in Table 3. In this case, the system control unit 102 can set the operation conditions for changeable parts of a supportable matrix type when it operates in the matrix type set in operation 510.

In operation 511, an optimal optical recording power level is produced based on received NRZI data, and a recording waveform produced by the LD 106 is controlled. When an adaptive optical recording power level control mode is set as the operation mode of an optical drive, received data is discriminated according to the discrimination condition set in operation 508 to obtain an optimal optical recording power level, in operation 511. The level of optical power output from the PD 108 (a monitor-PD or front-PD), which directly receives light reflected by the disc 107 or light emitted from the LD 106, is controlled depending on the optimal optical recording power level. The plurality of power levels are updated depending on the controlled level of the optical power output from the PD 108.

A level is selected from the plurality of optical recording power levels, based on the result of the discrimination made by the data discrimination unit 103 according to the set discrimination condition and the varying range set by the system control unit 102. The adaptive optical recording power generator 105 selects necessary optical recording power levels from the optical power levels that are produced under the control of the recording waveform control unit 104 depending on the shape of a recording waveform, which is determined depending on the multiple-speed, the type of optical medium, and the result of the discrimination by the NRZI data discrimination unit 103. The adaptive optical recording power generator 105 controls the LD 106 using the selected optical recording power levels so that the LD 106 can generate a desired recording waveform.

In operation 512, an optical drive drives the LD 106, depending on the optical recording power levels produced in operation 511.

In operation 513, the system control unit 102 determines whether the recording mode terminates. If the recording mode terminates, the operations associated with the recording mode stop. On the other hand, if the recording mode does not terminate, the system control unit 102 repeats the operations 511 through 513.

If operation 507 determines that the current optical drive is not operating in the adaptive optical recording power level control mode, the operation 511 is executed. In this case, the adder 111 increases or decreases the level of light received from the filter 110, based on the optimal optical recording power level provided from the data discrimination unit 103. The adaptive optical recording power generator 105 is controlled to produce an optical recording power level according to the light level increase or decrease. Thus, the adaptive optical recording power generator 105 produces an optical recording power level corresponding to the shape of a recording waveform, which is determined based on the type of an optical medium, a recording multiple-speed, and the result of the analysis of NRZI data. Here, the discrimination of the received NRZI data is based on the relationship between a recording mark and either of the spaces before and behind the recording mark as shown in Table 1.

According to the present invention described above, the optical recording power of a laser diode, which is a light emitting device, is adaptively controlled according to the type of optical medium, a recording multiple-speed, and the shape of received data in order to meet the needs of various types of optical media and increasing multiple-speeds. This improves the quality of recording and the compatibility of an optical drive with respect to various types of optical media. For example, the technical features of the present invention can prevent an unexpected domain that is formed on an optical medium due to thermal accumulation or thermal interference occurring during recording because of the type of optical medium and a multiple-speed that are not covered by the optical drive. Thus, high-quality recording results are obtained regardless of the type of optical medium and the recording multiple-speed.

Although a few embodiments of the present invention have been shown and described, those skilled in the art will appreciate that changes may be made in these embodiments without departing from the principles and spirit of the invention, the scope of which is defined in the appended claims and their equivalents.

What is claimed is:

1. An optical drive comprising:
   a laser diode emitting light to an optical medium loaded in the optical drive; and
   a controller adaptively controlling optical recording power of the laser diode according to a type of the optical medium, a recording multiple-speed, a shape of received data in order to provide operability with various types of optical media and increasing multiple-speeds.

2. The optical drive of claim 1, wherein the controller sets discrimination conditions of data to be recorded and selects a range of the optical recording power to be varied according to the type of the optical medium and the recording multiple speed.

3. The optical drive of claim 2, wherein the controller obtains a level of the optical recording power by discriminating the shape of the received data based on the discrimination conditions.

4. The optical drive of claim 3, wherein the controller controls an optical power level corresponding to light reflected by the optical medium depending on the obtained level of the optical recording power.

5. The optical drive of claim 1, wherein the controller divides the optical recording power level into a plurality of power levels and adaptively varies the optical recording power levels.

6. An optical drive comprising:
   a laser diode emitting light to an optical medium loaded in the optical drive;
   a controller adaptively controlling optical recording power of the laser diode according to a type of the optical medium, a recording multiple-speed, and a shape of received data in order to provide operability with various types of optical media and increasing multiple-speeds;
   a digital-to-analog converter converting the optical recording power; and
   a laser diode driving unit driving the laser diode according to an analog signal output by the digital-to-analog converter.

7. A method of controlling an optical drive having a laser diode, the method comprising:
   discriminating a type of an optical medium loaded in the optical drive, a recording multiple-speed of the optical drive, and a shape of received data; and
   adaptively controlling optical recording power of the laser diode according to the type of the optical medium, the recording multiple-speed, and the shape of the received data in order to provide operability with various types of optical media and increasing multiple-speeds.

8. The method of claim 7, further comprising:
   setting discrimination conditions of data to be recorded, and
   selecting a range of the optical recording power to be varied according to the type of the optical medium and the recording multiple speed.

9. The method of claim 8, further comprising:
   obtaining a level of the optical recording power by discriminating the shape of the received data based on the discrimination conditions.

10. The method of claim 9, further comprising:
    controlling an optical power level corresponding to light reflected by the optical medium depending on the obtained level of the optical recording power.

11. The method of claim 7, wherein the adaptively controlling of the optical recording power of the laser diode comprises:
    dividing the optical recording power level into a plurality of power levels; and
    adaptively varying the optical recording power.

* * * * *